US011108854B2

(12) United States Patent
Lynar et al.

(10) Patent No.: US 11,108,854 B2
(45) Date of Patent: Aug. 31, 2021

(54) PEER-TO-PEER NETWORK FOR INTERNET OF THINGS RESOURCE ALLOCATION OPERATION

(71) Applicant: International Business Machines Corporation, Armonk, NY (US)

(72) Inventors: Timothy M. Lynar, Melbourne (AU); Olivia J. Smith, Melbourne (AU); Ramachandra R. Kolluri, Balaclava (AU)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 204 days.

(21) Appl. No.: 16/045,166

(22) Filed: Jul. 25, 2018

(65) Prior Publication Data
US 2020/0036784 A1    Jan. 30, 2020

(51) Int. Cl.
*H04L 29/08* (2006.01)
*H04L 12/911* (2013.01)
*H04L 12/741* (2013.01)

(52) U.S. Cl.
CPC ........ *H04L 67/1074* (2013.01); *H04L 45/745* (2013.01); *H04L 47/70* (2013.01);
(Continued)

(58) Field of Classification Search
CPC ....... G06F 13/00; G06F 15/16; H04L 12/741; H04L 12/911; H04L 12/5695; H04L 29/06; H04L 29/08; H04L 29/0809; H04L 29/08072; H04L 29/08135; H04L 29/08144; H04L 29/08171; H04L 29/08648; H04L 29/08981; H04L 45/745; H04L 47/70; H04L 67/12; H04L 67/104; H04L 67/1008; H04L 67/1046;
(Continued)

(56) References Cited

U.S. PATENT DOCUMENTS

| | | | | |
|---|---|---|---|---|
| 7,958,262 B2 * | 6/2011 | Hasha | ............... | H04L 29/12103 709/243 |
| 8,392,515 B2 * | 3/2013 | Kakivaya | ............ | H04L 61/1541 709/206 |

(Continued)

FOREIGN PATENT DOCUMENTS

CN    101170578 A    4/2008

OTHER PUBLICATIONS

Korzun et al, "Hierarchical architectures in structured peer-to-peer overlay networks", Research Gate, 2013, 36 pages.
(Continued)

*Primary Examiner* — Robert B Harrell
(74) *Attorney, Agent, or Firm* — Cantor Colburn LLP; Joseph Petrokaitis (57) ABSTRACT

A computer-implemented method for implementing an overlay network on peer-to-peer network to enable resource allocation that accounts for attributes and statuses of one or more nodes therein is provided. The computer-implemented method includes registering one or more nodes with the overlay network and executing overlay registration routing of the one or more nodes by building a routing table to cause node types to know about each other. Overlay sorting is executed between the node types based on corresponding characteristics.

14 Claims, 6 Drawing Sheets

(52) U.S. Cl.
CPC ...... *H04L 67/1008* (2013.01); *H04L 67/1046* (2013.01); *H04L 67/1065* (2013.01); *H04L 67/1093* (2013.01); *H04L 67/12* (2013.01)

(58) Field of Classification Search
CPC ............. H04L 67/1065; H04L 67/1074; H04L 67/1076; H04L 67/1093; H04L 9/08; H04L 67/00; H04L 67/02
USPC ......................................... 709/201, 224, 226
See application file for complete search history.

(56) References Cited

U.S. PATENT DOCUMENTS

| | | | | |
|---|---|---|---|---|
| 8,417,813 | B2* | 4/2013 | Kakivaya | H04L 45/54 709/224 |
| 8,549,180 | B2* | 10/2013 | Critchley | H04L 61/1511 709/251 |
| 2011/0282989 | A1 | 11/2011 | Geirhofer et al. | |
| 2012/0197962 | A1* | 8/2012 | Maenpaa | H04L 67/1065 709/201 |
| 2015/0127733 | A1 | 5/2015 | Ding et al. | |

OTHER PUBLICATIONS

Maiti et al., "Node Allocation in Peer-to-Peer Overlay Networks based Remote Instrumentation with Smart Devices", ITNAC 2016, 8 pages.

Pilloni et al., "Dynamic Involvement of RealWorld Objects in the IoT: A Consensus-Based Cooperation Approach", sensors 2017, 17 pages.

Rowstron et al., "Pastry: Scalable, Decentralized Object Location, and Routing for Large-Scale Peer-to-Peer Systems", Springer 2001, 22 pages.

Singha et al., "Resource Allocation in Peer-to-Peer Networks: A Control Theoretical Perspective", IEEE, 2015, 13 pages.

Yan et al., "Ranking-based Optimal Resource Allocation in Peer-to-Peer Networks", IEEE, 2007, 9 pages.

* cited by examiner

| Node 510 | Overlay Node 530 | Registration Node 550 |
|---|---|---|
| Hash<br>IP address<br>Directory<br>Neighborhood<br>Leaf node set<br>Up-since<br>   MAC address | Processor type<br>Dynamic data<br>   Overlay Registry<br>   Leaf Registry set | Node registry |
| Broadcast<br>Init self<br>Route<br>Send Tables<br>Prune Node<br>   Check Neighbors | Register self<br>Route<br>Execute<br>Update status<br>Add Registry<br>   Advertise<br>   Registry | Sort nodes<br>Add Node<br>   Advertise self |

PEER-TO-PEER NETWORK FOR INTERNET OF THINGS RESOURCE ALLOCATION OPERATION

BACKGROUND

The present invention relates in general to resource allocation operations. More specifically, the present invention relates to peer-to-peer networking for internet of things resource allocation operations.

Contemporary peer-to-peer networking is a distributed application architecture that partitions tasks or workloads between peers or nodes. In general, nodes are equally privileged participants in the distributed application architecture. However, when one or more nodes underperform, have increased down time, and/or are behind a slow connection, equally privileging all nodes in a peer-to-peer network can have a negative impact on efficiency and speed. For example, because peer-to-peer topologies do not make a distinction between low cost local network transmissions and high cost remote transmission, contemporary peer-to-peer networking may incorrectly leverage nodes with high cost remote transmissions while other nodes with low cost local network transmissions are left unused.

SUMMARY

According to one or more embodiments of the invention, a computer-implemented method for implementing an overlay network on peer-to-peer network to enable resource allocation that accounts for attributes and statuses of one or more nodes therein is provided. The computer-implemented method includes registering one or more nodes with the overlay network and executing overlay registration routing of the one or more nodes by building a routing table to cause node types to know about each other. Overlay sorting is executed between the node types based on corresponding characteristics.

According to one or more embodiments, the computer-implemented method(s) described herein can be implemented as a system and/or a computer program product.

Additional features and advantages are realized through the techniques of the present disclosure. Other embodiments and aspects of the disclosure are described in detail herein. For a better understanding of the disclosure with the advantages and the features, refer to the description and to the drawings.

BRIEF DESCRIPTION OF THE DRAWINGS

The subject matter is particularly pointed out and distinctly claimed in the claims at the conclusion of the specification. The forgoing and other features, and advantages of the embodiments herein are apparent from the following detailed description taken in conjunction with the accompanying drawings in which:

DETAILED DESCRIPTION

Various embodiments of the invention are described herein with reference to the related drawings. Alternative embodiments of the invention can be devised without departing from the scope of this invention. Various connections and positional relationships (e.g., over, below, adjacent, etc.) are set forth between elements in the following description and in the drawings. These connections and/or positional relationships, unless specified otherwise, can be direct or indirect, and the present invention is not intended to be limiting in this respect. Accordingly, a coupling of entities can refer to either a direct or an indirect coupling, and a positional relationship between entities can be a direct or indirect positional relationship. Moreover, the various tasks and process steps described herein can be incorporated into a more comprehensive procedure or process having additional steps or functionality not described in detail herein.

For the sake of brevity, conventional techniques related to making and using aspects of the invention may or may not be described in detail herein. In particular, various aspects of computing systems and specific computer programs to implement the various technical features described herein are well known. Accordingly, in the interest of brevity, many conventional implementation details are only mentioned briefly herein or are omitted entirely without providing the well-known system and/or process details.

Turning now to an overview of technologies that are more specifically relevant to aspects of the invention, peer-to-peer networking is a distributed application architecture that partitions tasks or workloads between peers or nodes that are equally privileged participants.

Turning now to an overview of the aspects of the invention, one or more embodiments of the invention address the above-described shortcomings of the prior art by providing a peer-to-peer network used for internet of things (IoT) resource allocation. The peer-to-peer network is designed to execute a resource allocation fabric where any node within the peer-to-peer network is enabled to allocate any task to a most desirable node at any time with minimal network communication or overhead. In accordance with one or more embodiments, the resource allocation fabric can be applied to an IoT network and/or any distributed network. Further, with the peer-to-peer network, an overlay network that enables the resource allocation fabric to account for both attributes and statuses of the nodes. This accounting by the resource allocation fabric is achieved by the overlay network's leveraging of a homogeneous character of node types and allowing messages to be routed to dominate nodes, determined by current status, within the node types.

The above-described aspects of the invention address the shortcomings of the prior art by providing an ability for all nodes to find each other if they know each other's hash, an effective method for all nodes of a same type to find each other without knowing each other's hashes, and a method to deal with peers that may be unstable. Further, technical effects and benefits herein include providing an overlay network that allows for dominance based return of dynamic data through a hierarchy and allowing for the transmission of execution requests and a return of execution results. Note that the overlay network leverages a homogeneous nature of devices which are typically in groups of homogeneous nodes (within the homogeneous groups, there is heterogeneous status). Utilizing these attributes requests are optimally allocated and to reduce all required communication to optimally allocate resources. Thus, embodiments described herein are necessarily rooted in processors of the system (a processing system) to perform proactive operations to overcome problems specifically arising in the realm of contemporary peer-to-peer networking. For example, in this regard, the system overcomes problems arising with contemporary peer-to-peer networking by using up-time for a selection of nodes as super nodes and differentiating between low cost neighbor connections and high cost external connections.

Figure 1:
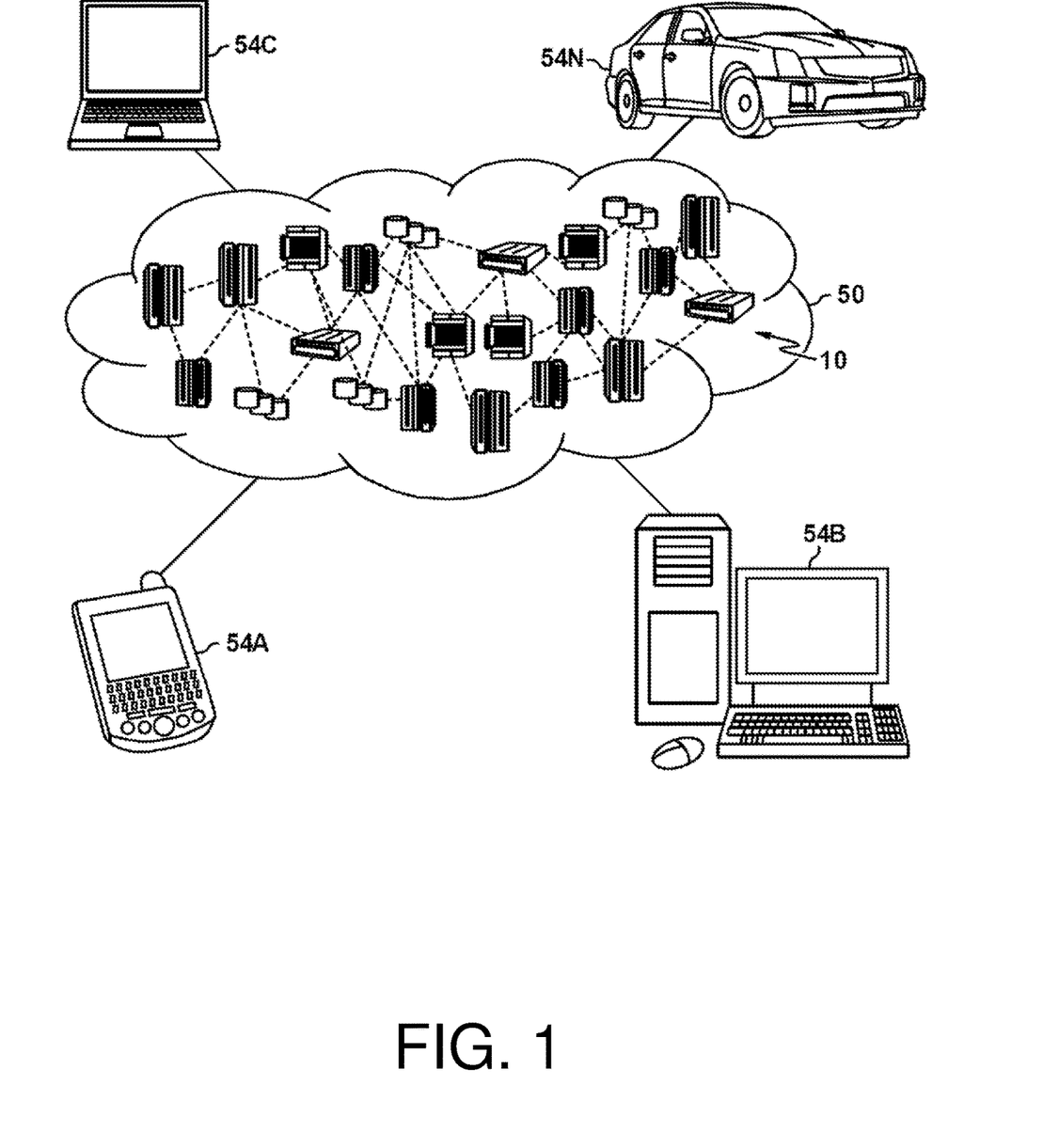
FIG. 1 depicts a cloud computing environment according to one or more embodiments.

Referring now to FIG. 1, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 1 are intended to be illustrative only and that computing nodes 10 and cloud computing environment 50 can communicate with any type of computerized device over any type of network and/or network addressable connection (e.g., using a web browser).

Figure 2:
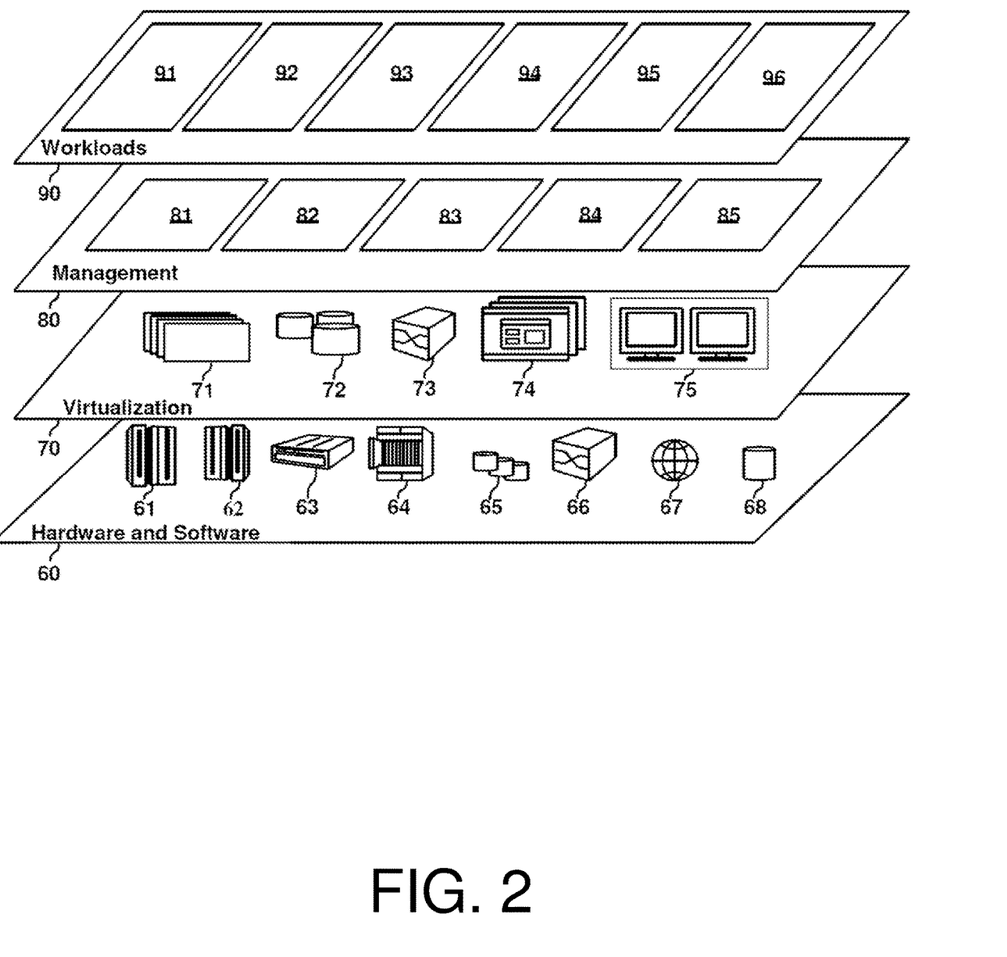
FIG. 2 depicts abstraction model layers according to one or more embodiments.

Referring now to FIG. 2, a set of functional abstraction layers provided by cloud computing environment 50 (FIG. 1) is shown. It should be understood in advance that the components, layers, and functions shown in FIG. 2 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments of the invention, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and resource allocation processing 96.

In view of the above, the system comprising the peer-to-peer network used for internet of things (IoT) resource allocation is described. In accordance with one or more embodiments of the invention, an architecture of the system decreases a likelihood of orphaned branches and increases a probability that nodes identify root nodes in common. In this regard, key technical improvements of the system over contemporary peer-to-peer networking include, but are not limited to, the use of up-time for the selection of nodes as super nodes; the structure and size of the routing table, and the perceived value based method of pruning the routing table; the differentiation between low cost local network transmission and high cost remote transmission; and the use of an overlay network that allows for dominance based return of dynamic data through a hierarchy.

The system includes a hashing function, which is used to convert some unique descriptive data on a node into a unique key or hash (of a fixed length). That is, nodes are addressed by their hash, and the hash function produces a uniform distribution of these hashes. In accordance with one or more embodiments of the invention, the unique descriptive data is a media access control (MAC) address of the node (e.g., keys are based on a hash of the node's MAC address). Examples of candidate hash functions include SHA 1 and MD5.

In some cases, a hash collision can occur. If a new hash of a joining node collides with a hash of a seed node (the node with which the new hash collided), the joining node will not be able to join the peer-to-peer network of the system. In turn, when a hash collision occurs, the system executes a salting process. The salting process, once a hash collision is detected, minimizes the cost of the hash collision. The salting process includes when systematic relevant characters/strings are added to the hashed string in an attempt to generate another hash. This salting process repeats until no collision is present as known by the seed node (the node with which the hash initially collided).

The system includes directories that store lists of nodes and interne protocol (IP) addresses (e.g., each node has a directory for routing). Directories store entries for all nodes requested and each entry has a value based on an uptime of the node it represents and its relationship to the current node in hash space. High uptime nodes float to the top, i.e., they are selected as higher level nodes where there is contention.

Figure 3:
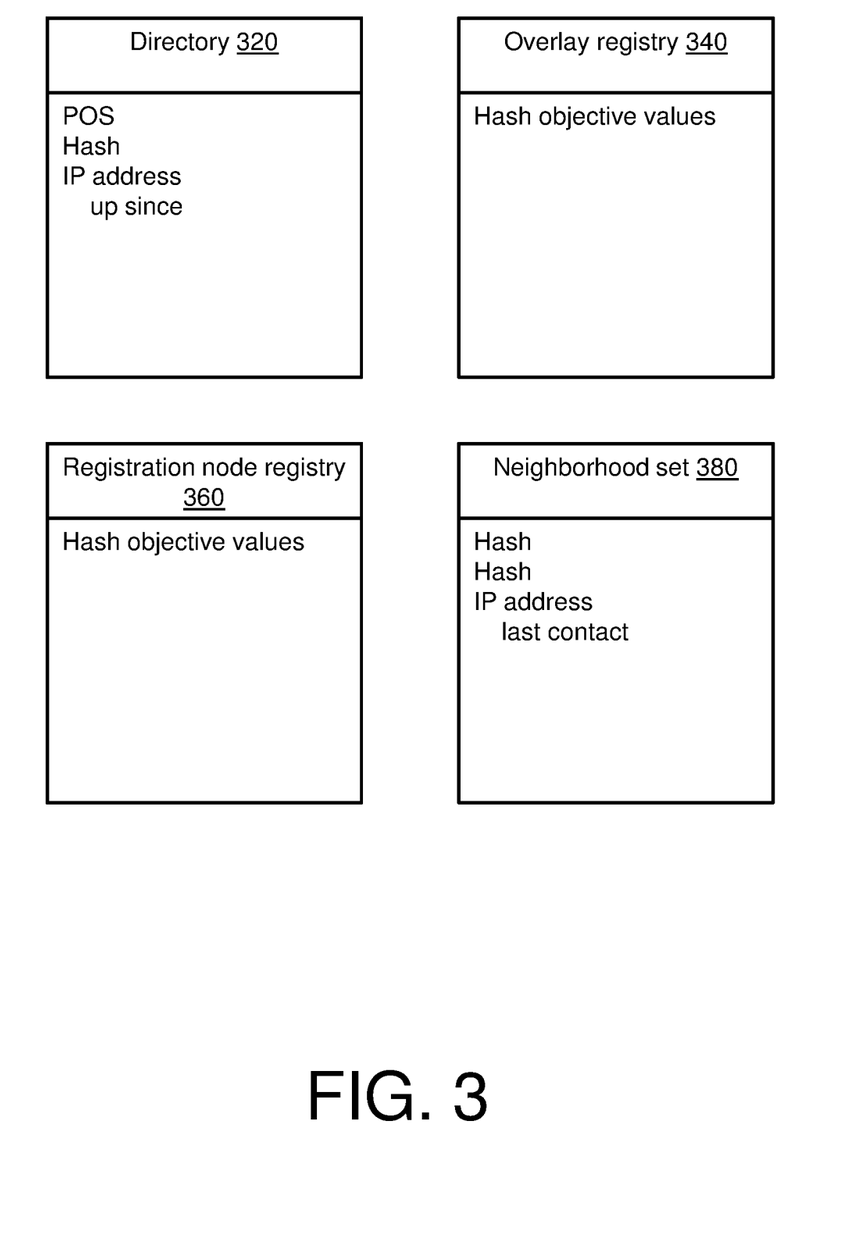
FIG. 3 depicts data structures of the system in accordance with one or more embodiments.

In accordance with one or more embodiments of the invention, each directory contains entries with the following data: table position (POS), Hash, IP address, and up-since (e.g., see a directory 320 of FIG. 3 as described herein). Each directory further specifies a tree for the corresponding node, each tree being different for different nodes, which reflects each node having different data. The directories allow the system to route communications, as each directory acts as a primary routing table. In general, a directory contains a row for each character to the length of a hash (e.g., each row in the routing table represents a digit in the hash ID). As hashes have fixed lengths, using hashes of X characters equates to a directory with X rows.

The system includes routing operations, such as by using the directory in the routing of messages and for the resolution of node's hashes to their IP address. Routing within this system can be described using a pseudo-code according to Algorithm 1.

Algorithm 1—Routing procedure
1: procedure Route
2: IF the target is in the leaf nodes or neighborhood set THEN
3: send directly to the known node
4: ELSE
5: use routing table to send to the node with the longest common pre_x
6: IF there is no common pre_x in the routing table THEN
7: send to the node numerically closest in the routing table, as determined by XOR The routing procedure will repeat until the desired node is found. As an example, node AAB tries to find node BBC. Node AAB knows node B, so node AAB sends a request to node B. Node B knows node BB and sends the request to node BB. Node BB knows node BBC and returns the result to node B, who stores and returns the result to node AAB. Node AAB stores the result. AAB now knows nodes BB and BBC, and node B also knows node BBC.

The system includes node discovery operations. Node discovery operations include when a new node learns nodes already in the peer-to-peer network of the system. In accordance with one or more embodiments of the invention, node discovery operations include a user diagram protocol (UDP) broadcast and/or pre-seeding. Pre-seeding includes specifying at runtime, a public IP address and port of a known member of the peer-to-peer network of the system. Pre-seeding, when enabled, allows nodes from distant networks to discover and join the peer-to-peer network of the system. Pre-seeded nodes will not be added to a neighbor's set of the node it is seeded from. Thus, the neighbor's set is only be populated by nodes that are discovered through broadcast and are thus on the same network as 'allother' nodes within that neighborhood set 380 (e.g., see FIG. 3). A neighborhood set 380 is a group of geographically close nodes, where close is intended to be close. In accordance with one or more embodiments of the invention, each neighborhood set 380 contains one or more hashes, IP addresses, etc. A caveat is that a first node in any new network does not have a seed node.

The system includes node adding operations. Node adding operations include when a new node N finds an initial node via UDP broadcast, or by known seed IP address. The known/discovered node D routes the request to join to the node that is numerically closest to the new node N. The numerically closest node is referred to as node C. Node C. can be determined in the same manner as routing, i.e., a longest common pre_x. Routing tables on all nodes between D and C. are sent to the new node N. Conflicts between entries are decided by longevity, i.e, the node with the longest uptime wins. When building the directory for the new node N, the first row of the directory and the entire neighborhood set 380 are taken from node D, while the remaining rows of the directory are taken from all nodes between D and C. with any remaining rows filled by node C. The i-th line of the routing table is taking from the i-th node encountered along the route from node D to C. all remaining rows are filled by the directory of node C. Once the new node N has its tables, it sends a copy of its state to each of the nodes found in its neighborhood set 380, leaf set, and along its path to find node C. These nodes update their state.

Initially, a new node N may have no leaf nodes. In this case, the new node N can be added as a leaf of node C. The procedure for adding a new node is defined in Algorithm 2.

Algorithm 2—Adding A Node Procedure
1: procedure Add new node N
2: Find or specify initial node D
3: send initialization to node D
4: IF node discovery was not via pre-seeding THEN
5: node D sends neighborhood set to new node N
6: new node N advertises itself to all nodes in the neighborhood set
7: node D is the current node C
8: WHILE there are known nodes that are numerically closer to the new node N than the current node D
9: forward the initialization to the node with the largest common pre_x with node N, this node is now node C
10: send back directory of the current node to new node N
11: IF there are no nodes with pre_xes in common with new node N THEN
12: route request to the node with the numerically closest hash to new node N
13: new node N is a leaf node C, the node with the largest common pre_x to new node N
14: new node N produces a directory
15: all nodes that received the initialization between nodes C and D add an entry for new node N in their directory The system includes network maintaining operations. Network maintaining operations include node removal, hash collision, self-optimization, balancing, defining super and/or leaf nodes, and pruning.

With respect to node removal, the system implements two failure modes in accordance with one or more embodiments of the invention. In one case, if neighboring nodes find a failed node. The neighbor node NN to the failed node contacts a live node L with a largest index on a side of the failed node, and asks the live node L for its leaf table. One of these nodes is determined and confirmed to be alive, before being added. The system then updates.

In another case, if a failed node is found because it cannot be contacted, a search be performed by a requesting node. The search includes requesting adjacent nodes then super nodes. The requesting node finds one node then gives that node all the known leaf nodes that it should have to take on the space.

With respect to hash collisions, as noted herein, if the system identifies a hash collision with an existing hash, then a new node N is not able to join the peer-to-peer network. The system thus implements a joining procedure that salts hashes with random data. This process repeats until no collision is present.

With respect to self-optimization, the system automatically organizes directories to place nodes with a highest uptime at a top of the tree. Selection for higher level keys is decided based on the uptime of nodes. For instance, if there are only two nodes that have a hash that starts with AA the one with the highest uptime will be selected as the entry for AA in the table.

With respect to balancing, the system makes inquiries when a new node N is added to the directory. In accordance with one or more embodiments of the invention, for instance, the node that adds the new node N asks: should this node be my leaf; should this node be my super node; and should any of my leaf nodes be its leaf nodes. If any of the above are true then the change is made.

With respect to super and leaf nodes, the system can implement the following definitions. A supernode is any node that also serves as one of that peer-to-peer network's relayers, handling data flow and connections for other nodes. A leaf node is any connected node. To establish leaf nodes, a new node N acquires all of the close node's leaf nodes. Then those leaf nodes add the new node N to their directory.

With respect to pruning, the system implements operations whereby dead nodes are detected and replaced, to keep a tree (i.e., the peer-to-peer network) healthy. That is, as the directory grows over time, pruning prevents uncontrolled directory growth by removing stale and low value entries. In accordance with one or more embodiments of the invention, low character pre_xes are more valuable than high character pre_xes because low character pre_xes nodes are assumed to be long lived, know their own tree, and can provide access to the nodes. For these reasons, where there is a maximum tree size variable, using the number of character pre_xes the system can ensure routing while keeping a size of the directory down.

In view of the description herein, an overlay network as implemented by the system is described, along with secondary routing tables and their role in resource allocation, in accordance with one or more embodiments of the invention. Note that an idea behind any directory is to map a hash to an IP address so that all nodes can connect to one another (if/when they know one another). Yet, directories are limited in that they do not sort nodes by node type, nor do directories help in identifying a most desirable node to execute a task. The overlay network and component part provide a sorting of nodes by node type and identify a most desirable node to execute a task.

Figure 4:
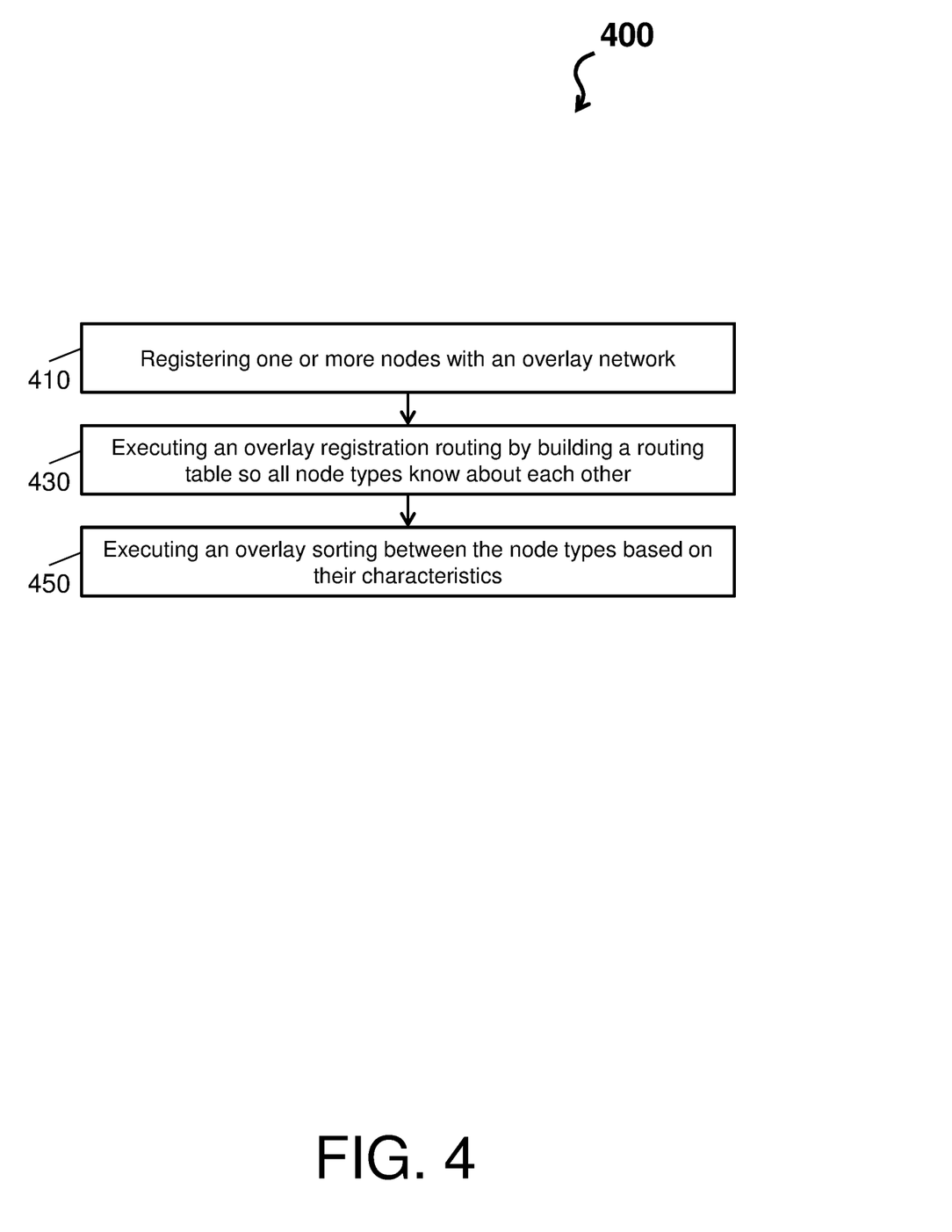
FIG. 4 depicts a process flow in accordance with one or more embodiments.

In accordance with one or more embodiments of the invention, the overlay network relies on homogeneity in the network and, within that homogeneity, there will be nodes that are invariably heterogeneous in both static state and current state. In turn, the overlay network needs nodes to group based on node type and ensure every other node knows about its node type. Therefore, the overlay network implements a separate routing table, such as an overlay routing table. Turning to FIGS. 3 and 4, the overlay network is described.

FIG. 3, data structures of the system are depicted in accordance with one or more embodiments of the invention. These data structures (e.g., a directory 320, an overlay registry 340, a registration node registry 360, and a neighborhood set 380) are further described herein.

FIG. 4 depicts a process flow 400 in accordance with one or more embodiments of the invention. The process flow 400 relates to registration, sorting, routing of one or more nodes with respect to the overlay network to enable a resource allocation fabric of the system to account for both attributes and statuses of the one or more nodes. This accounting by the resource allocation fabric is achieved by the overlay network's leveraging of a homogeneous character of node types and allowing messages to be routed to dominate nodes, determined by current status, within the node types.

Figure 5:
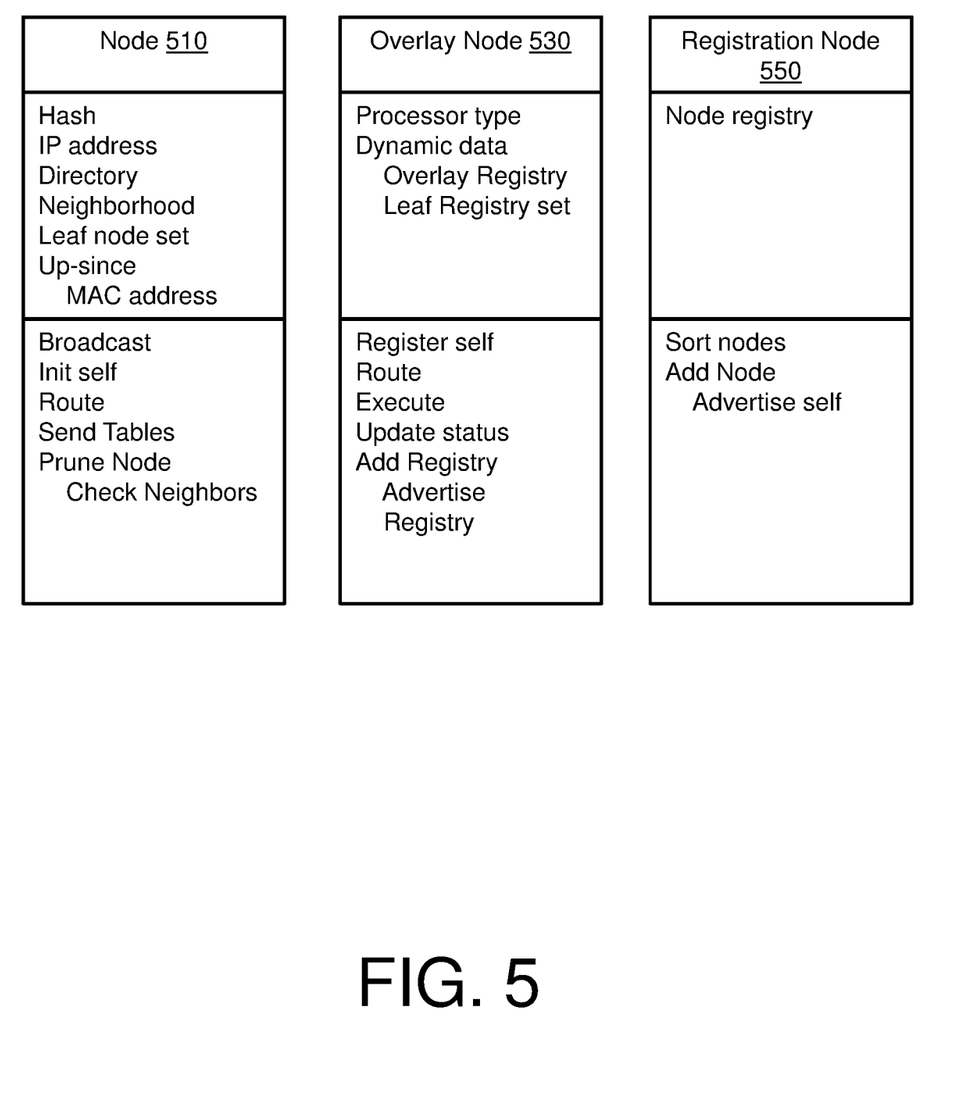
FIG. 5 depicts node types in accordance with one or more embodiments.

FIG. 5 depicts node types in accordance with one or more embodiments of the invention. As shown in FIG. 5, the node types of the overlay network include a node 510, an overlay node 530, and a registration node 550. Note that the overlay node 530 extends the node 510, and the registration node 550 extends the overlay node 530.

Returning to FIG. 4, the process flow 400 begins at block 410, where one or more nodes are registered with the overlay network. Registration allows all like nodes to find one another. It does so in a manner that provides an acceptable level of redundancy.

Regarding overlay registration of a node, initially, that node's processor string is hashed. This string produces a same hash for nodes with the same processor string. Note that all nodes that are identical have the same 'processor string,' but some nodes that are not identical, but have identical processors, may also have this string by virtue of having the same processor (which is acceptable). Each node registers its status with the known nodes T with a hash closest to the hash of the processor identification (ID) string. Each of these nodes can be referred to as node R. Also, because of the setup of the directory 320, every hash is directed to a node and if an exact hash is not in the directory 320 then a message is routed to the closest node.

When registering the node at block 410, the node can be referred to the first node T0 with a second node being its super node T1. Any additional nodes are leaf nodes of the super node T1 (if they exist). This enables like nodes to find one another. When a node registers with a node R, it is given details on all node R leaf nodes, which it adds to its routing table. It is also given the ID, IP address, and status of all other nodes registered to node R. In accordance with one or more embodiments of the invention, node R may be the register of multiple processor types.

Figure 6:
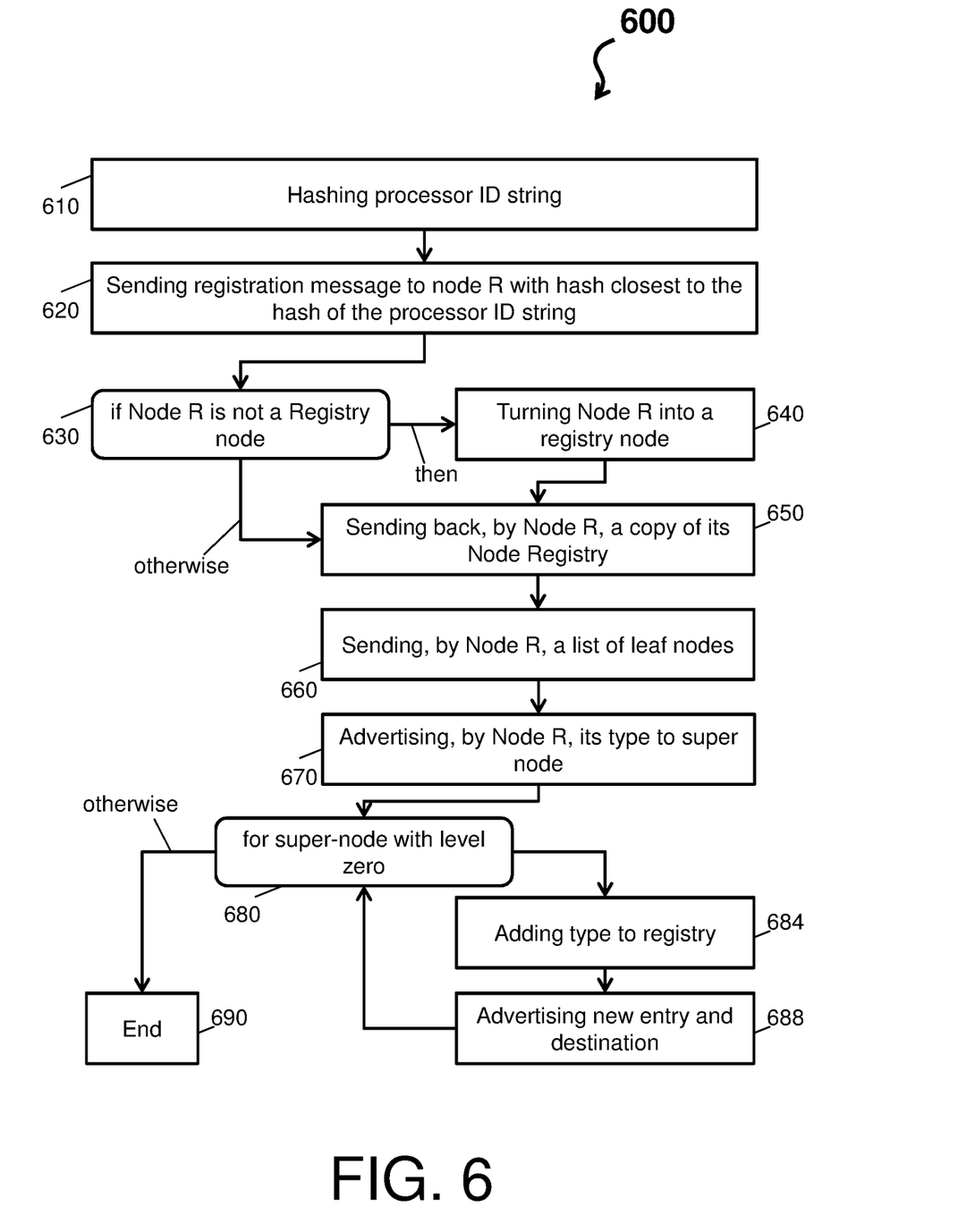
FIG. 6 depicts process flow for node overlay registration procedure in accordance with one or more embodiments.

The process flow 400 continues at block 430, where the overlay network of the system executes an overlay registration routing by building a routing table to cause all node types to know about each other. Initially, when a new node type is discovered, the node that is this new type advertises using its directory 320. Turning now to FIG. 6, a process flow 600 relating to a node overlay registration procedure is depicted in accordance with one or more embodiments of the invention.

The process flow 600 begins at block 610, where the system hashes a processor ID string (e.g., a MAC or hardware address) of a new overlay node 530. At block 620, the system sends a registration message to a node R with a hash closest to the hash of the processor ID string. At condition block 630, if node R is not a registration node 550, then the process flow 600 proceeds to block 640 as shown by the 'then' arrow. At block 640, node R becomes a registration node 550 (e.g., if node R is not a registration node 550 then node R turns into the registration node 550 for the new overlay node 530). Otherwise, if node R is a registration node 550, then the process flow 600 proceeds directly to block 650 as shown by the 'otherwise' arrow.

At block 650, node R sends a copy of its Node Registry to the new overlay node 530. At block 660, node R sends a list of leaf nodes new overlay node 530. At block 670, node R advertises its type to a super node. At condition block 680, the process flow 600 enters a 'for' loop until the super node has a level zero. In turn, at block 684, the super node adds the type to its registry. At block 688, the super node advertises this new entry and destination. That is, if the super node has no record of the new overlay node 530, then the super node advertises to its leaf nodes. This repeats as needed. Otherwise, the process 600 proceeds to block 690 and ends (as shown by the 'otherwise' arrow).

Further, any node that receives a new advertisement forwards the advertisement to its super node and leaf nodes (but not to the node it received the advertisement from). All nodes contacted will store the entry, and thus the overlay routing table is built. The overlay routing table contains records of: the Type hash, hash of type registration node, IP of registration node, Static values for node types, etc. For example, in accordance with one or more embodiments of the invention, each registration node 550 includes a registry including hash objective values (e.g., see the registration node registry 360 of FIG. 3). Note by virtue of there being multiple closest nodes and by virtue of all nodes not knowing each other, there may be at least T times the number of unique processor strings worth of entries in the registration routing table. Every level zero node knows about all registration nodes in its tree and all registration nodes know about all nodes of their type.

Returning to FIG. 4, the process flow 400 continues at block 450, where an overlay registry 340 executes an overlay sorting between node types based on their characteristics. Further, each registration node 550 sorts between nodes based on their instantaneous status.

Sorting within a registration node 550 includes when a status of a node changes, the node with the changing status informs its registration node 550. If the registration node 550 is not yet a registration node 550, it will become one as a result of this call (the status change message). The registration node 550 then sorts the list of nodes based on their relative status. The registration node 550 has a list per processor ID hash. Each list is maintained separately. In accordance with one or more embodiments of the invention, status is defined by an indication of utilization and/or availability.

Every node can have an overlay registry 340 (e.g., see FIG. 3). The overlay registry 340 allows for efficient allocation of resources and/or selection of dominate resources within a set. The overlay registry 340 sorts between node types based on their characteristics and each registration node 550 sorts between nodes based on their instantaneous status. In accordance with one or more embodiments of the invention, each overlay registry 340 includes Hash objective values. That is, the overlay registry 340 contains a link to the registration node 550 for each type of node. All registration nodes 550 are listed in the overlay registry 340. Each registration node 550 advertises a value for its top node for each of the predefined metrics. This process occurs each time a node is added to the registration node 550. These values are advertised to the registration node's super node, which advertises a top leaf registration node's performance to their super node. This continues until level zero. In this way, all super nodes have a value for and a link to their top performing sub-node where that sub-node is a registration node 550. Accordingly, routing a task to a super node over the overlay results in the task being sent to a top performing registration node (as sorted by that registration node 550).

With respect to the top node advertisement, to route a task to the top available node, the system reads a value of all level zero super nodes. Note that Routing a task to the top level zero super node results in that task being routed to the registration node 550 that has the type of nodes that are top for that static metric, which results in tasks being assigned to that registration node's top performing dynamic node. Where no node is available for a registration node 550, nodes update static values to negative values to cause a re-sorting of its type. When nodes become available again, nodes will re-establish their former value. In order to avoid over exploitation of level zero nodes, the hash of the most desirable node should be transmitted down to all leaf nodes, which in-turn pushes down the highest value to their leaf nodes. Nodes only ever update and push up a value if that value exceeds the value pushed down or is negative.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as Follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as Follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).
Deployment Models are as Follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments of the invention, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one more other features, integers, steps, operations, element components, and/or groups thereof The descriptions of the various embodiments herein have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method for implementing an overlay network on peer-to-peer network to enable resource allocation that accounts for attributes and statuses of one or more nodes therein, the computer-implemented method comprising:
   registering, by a processing system, the one or more nodes with the overlay network;
   executing, by the processing system, overlay registration routing of the one or more nodes by building a routing table to cause node types to know about each other;
   sending, by the processing system and from a known overlay node, a registration message to a node with a hash closest to a hash of a new overlay node;
   routing, by the processing system, a first line from a directory associated with the known overlay node to a directory associated with the new overlay node;
   routing, by the processing system, each other line of the directory associated with the new overlay node from the registration node; and
   executing, by the processing system, overlay sorting between the node types based on corresponding characteristics.

2. The computer-implemented method of claim 1, wherein the overlay registration routing comprises:
   hashing a processor identification string of the new overlay node.

3. The computer-implemented method of claim 2, wherein if the node with the hash closest to the hash of the new overlay node is not a registration node then the node with the hash closest to the hash of the new overlay node turns into the registration node for the new overlay node.

4. The computer-implemented method of claim 3, wherein the known overlay node extends the node, and the registration node extends the known overlay node.

5. The computer-implemented method of claim 1, wherein the overlay sorting includes automatically organizing directories of the one or more nodes to place nodes with a highest uptime at a top of a tree.

6. A computer program product comprising a computer readable storage medium having program instructions for implementing an overlay network on peer-to-peer network to enable resource allocation that accounts for attributes and statuses of one or more nodes embodied therewith, the program instructions executable by a processor to cause:
   registering the one or more nodes with the overlay network;
   executing overlay registration routing of the one or more nodes by building a routing table to cause node types to know about each other;
   sending, from a known overlay node, a registration message to a node with a hash closest to a hash of a new overlay node;
   routing a first line from a directory associated with the known overlay node to a directory associated with the new overlay node;
   routing each other line of the directory associated with the new overlay node from the registration node; and
   executing overlay sorting between the node types based on corresponding characteristics.

7. The computer program product of claim 6, wherein the overlay registration routing comprises:
   hashing a processor identification string of the new overlay node.

8. The computer program product of claim 7, wherein if the node with the hash closest to the hash of the new overlay node is not a registration node then the node with the hash closest to the hash of the new overlay node turns into the registration node for the new overlay node.

9. The computer program product of claim 8, wherein the known overlay node extends the node, and the registration node extends the known overlay node.

10. The computer program product of claim 6, wherein overlay sorting includes automatically organizing directories of the one or more nodes to place nodes with a highest uptime at a top of a tree.

11. A system comprising a peer-to-peer network and an overlay network on the peer-to-peer network, the overlay network enabling resource allocation that accounts for attributes and statuses of one or more nodes, the system configurable to perform:
   registering the one or more nodes with the overlay network;
   executing overlay registration routing of the one or more nodes by building a routing table to cause node types to know about each other;

sending, from a known overlay node, a registration message to a node with a hash closest to a hash of a new overlay node;

routing a first line from a directory associated with the known overlay node to a directory associated with the new overlay node;

routing each other line of the directory associated with the new overlay node from the registration node; and executing overlay sorting between the node types based on corresponding characteristics.

12. The system of claim 11, wherein the overlay registration routing comprises:

hashing a processor identification string of the new overlay node.

13. The system of claim 12, wherein if the node with the hash closest to the hash of the new overlay node is not a registration node then the node with the hash closest to the hash of the new overlay node turns into the registration node for the new overlay node.

14. The system of claim 11, wherein the overlay sorting includes automatically organizing directories of the one or more nodes to place nodes with a highest uptime at a top of a tree.

* * * * *